Nov. 25, 1941.  H. PENDL  2,263,703
PROCESS FOR EVAPORATING INDUSTRIAL LIQUIDS WHICH
TEND TO FORM SCALE ON HEATING SURFACES
Filed March 8, 1939
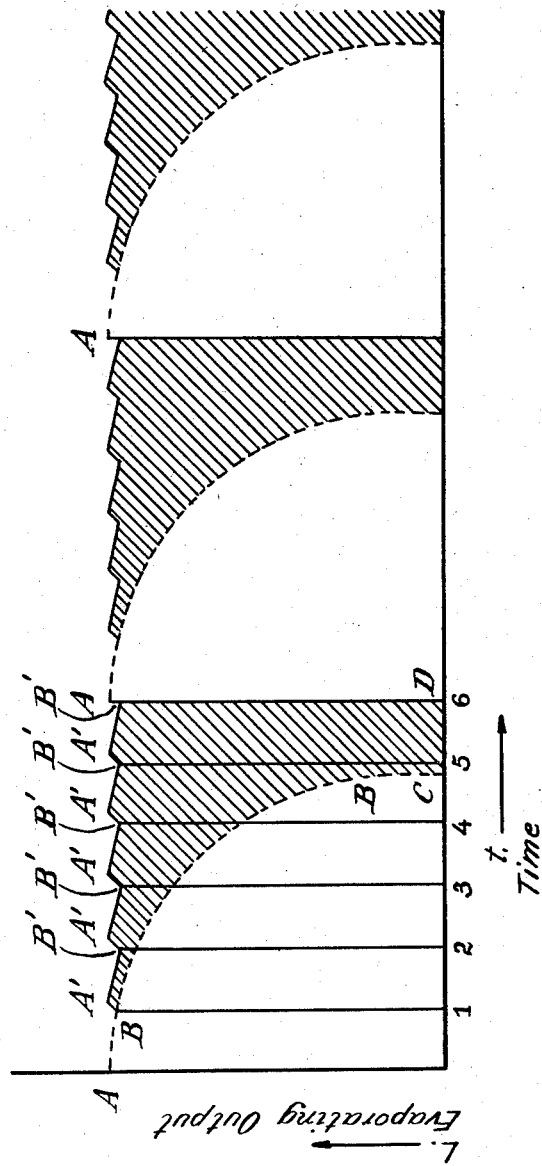
INVENTOR
Heinz Pendl
BY
Pennie, Davis, Marvin & Edmonds
ATTORNEYS Patented Nov. 25, 1941

2,263,703

UNITED STATES PATENT OFFICE 2,263,703

PROCESS FOR EVAPORATING INDUSTRIAL LIQUIDS WHICH TEND TO FORM SCALE ON HEATING SURFACES

Heinz Pendl, Frankenthal, Germany, assignor to Aktiengesellschaft Kühnle, Kopp & Kausch, Frankenthal, Germany, a company of Germany Application March 8, 1939, Serial No. 260,560
In Germany March 15, 1938

6 Claims. (Cl. 159—47)

In the case of a large number of industrial liquids, which are to be concentrated by a process of evaporation, there occurs the objectionable circumstance that an undesired scale-forming substance is deposited on the heating surface. In this way, the transference of heat is impaired, so that, in many cases, an interruption of working and a mechanical or chemical cleaning of the heating surface becomes necessary.

In the case of the present invention, regard is had to the fact that, when the formation of a scale commences, the output of the evaporating apparatus decreases at first only very slowly and, finally, at a rate which continually increases. In addition, the invention is based on the observation that only a comparatively small fraction of the hardness-forming substances is deposited on the heating surface in the form of scale, whilst by far the greater part is washed away with the concentrated liquid.

A practical evaporating experiment showed that, for example, during the concentration of waste sulphite liquor (120 cubic metres) from 9° Beaumé to 36° Beaumé, a quantity of about 32 kg. of calcium sulphate had been deposited on the originally clean metallic heating surfaces. The laboratory experiment showed that, in the concentration to the final density required in this case, a quantity of calcium sulphate of 2.2 gms. per litre is precipitated. The total quantities of calcium sulphate precipitated in the evaporation are calculated as follows:

$$2.2 \text{ gms.} \times 120 \times 1000 = 264 \text{ kgs.},$$

so that only $$\frac{32 \times 100}{264} = 12\%$$

have been deposited on the heating surface.

It must be stated here that, at the present time, it is, in most cases, usual to proceed as follows when concentrating liquids that form scale:

The scale is allowed to grow for a certain time, the process is then interrupted and boiling is now effected with a suitable solvent. Dilute hydrochloric acid or dilute caustic soda solution, for example, or the like, has been found to be a suitable solvent. The interruption, that is necessary in this case, of the evaporating operation, for a longer or shorter time, and the circumstance that, on drawing off the liquid to be evaporated and, before the admission of the cleaning liquid, the scale sets or becomes hard on account of the heat capacity of evaporating apparatus are the very special disadvantages of this process that has hitherto been discontinuous.

Now, according to the invention, the liquids to be evaporated can also be used as solvents for the scale-forming substances if they are passed through the evaporating apparatus so rapidly that, with the comparatively low intermediate density, a certain reserve of solvent power still exists for the scale-forming substance.

It is thus possible to obtain a practically scale-free evaporation by working for, for example, 20 hours to the required final density in the evaporating apparatus and allowing the layer of calcium sulphate to grow to the amount that corresponds to this time of evaporation. Without having to interrupt the normal working appreciably, a quantity of the dilute liquid, or a part thereof, that corresponds to, for example, a total daily production, is then allowed to flow rapidly through the apparatus for the remaining 4 hours, so that liquid of comparatively low intermediate concentration is obtained. During this comparatively short period of working, the scale produced in the first period is again dissolved or washed away from the heating surface without having had the opportunity of first setting and become substantially harder the quantity of liquor, which corresponds to, for example, a daily production and which has, during the short second period of working, been brought to a comparatively low intermediate concentration, is stored in a special receptacle and then brought to the required final density during the first period of the next operation.

In this way, a continuous working can be obtained with practically unaltered full output, since the work is carried out almost without the formation of scale or, at least, without the occurrence of thick layers of scale which would considerably impair the efficiency.

The basis of the process described herein is thus the idea not, as in the known thermal or chemical processes for removing calcium sulphate from liquids that are to be evaporated, to prevent the formation of scale entirely, but to allow a slight formation of scale during the first period of the process in order to wash the scale in the second period of the process out again with quite simple means. The process works continuously, in contradistinction to the processes in which, from time to time, the evaporating operation has to be entirely interrupted for the purpose of mechanically or chemically cleaning the heating surfaces.

However, there are liquids which no longer possess a sufficient reserve of solvent power for taking up the scale-forming substance even with the said small intermediate concentration that is obtained in the second period of working. In such cases, it is necessary to reduce, with the aid of suitable processes, the concentration of the scale-forming substance before admission into the evaporator, to such an extent that, on the evaporation of the liquid to the intermediate concentration that comes into question, there is still in any case a reserve of solvent power for the scale-forming substance. Such processes for the complete or partial precipitation of the scale-forming substance may be of a chemical, thermal, or other nature.

Again, it is a known fact that, in the case of multi-stage evaporating installations, the last stages always tend to a greater extent to form scale. It is, consequently, advantageous, in such cases, during the shorter period of working in which, for the purpose of washing out or dissolving the scale that is produced in the preceding period of working, evaporation is carried out with a comparatively high velocity of flow and only to a small intermediate concentration, to put first the evaporating stages which were put last in the preceding period of working and which gave the greatest amount of scale. This comparatively very thick scale is, consequently, washed and, therefore, very rapidly removed by the most dilute liquor which still has the greatest reserve of solvent power.

For the purpose of explaining the conditions more fully, there is plotted, on the accompanying diagram, the hourly evaporating output L of a particular apparatus in dependence upon the time $t$. The present state of the art hereinbefore referred to is shown by the lower broken-line curve. Consequently, when the maximum hourly output is at A, concentration is carried out for so many days or working periods that the output (point B) has, owing to the formation of scale, decreased to such an extent that an economical evaporation is no longer possible. The plant is now stopped and the output diminishes to zero (point C). After the end of the cleaning period (point D), during which the heating surface has again been cleaned by heating, boring, boiling or the like, the evaporating plant is again put into operation. The full output is again at A and then again falls to B, whereupon the plant must again be put out of operation, and so on.

The process according to the present invention, however, is carried out as follows (see the upper curve):

Starting from A, evaporation to the required final density is effected by the longer part of the period of working until a small layer of the scale-forming substance has been deposited and the output has fallen to a small amount (to B'). Evaporation is now carried out during the shorter remaining period of the period of working, with a quantity of liquor that is as large as possible to an intermediate concentration that is as low as possible, the scale being again washed off the heating surfaces and the original output again being reached at A'. This operation is repeated during each of the periods of working that follow each other without interruption, so that the output is kept at the maximum almost continuously. The additional output obtained (during a long space of time) by the new process is formed by measuring, with a planimeter, the hatched pieces of surface that lie between the two branches of the curve.

If the process described is employed, for example, for the evaporation of a solution of lactic acid from 4° Beaumé to 13° Beaumé, the following conditions occur: A precipitation of 1.5 gms. per litre of calcium sulphate is obtained. With a quantity to be evaporated of 10 cubic metres per day, there therefore results a total precipitated quantity of calcium sulphate of 15 kgs., whilst only 2.1 kgs. of calcium sulphate, which is equal to 14% of the total quantity has been deposited on the heating tubes.

The evaporation process hereinbefore described may be performed, for example, as follows:

First a quantity, e. g., 10 cubic meters, which corresponds to a daily output, is evaporated to a final concentration of 13° Beaumé, 2.1 kgs. of calcium sulphate being deposited on the wall. Next, a quantity of 10 cubic meters used to dissolve the incrustations formed during the previous evaporation period is introduced at a concentration of 4° Beaumé and evaporated to 5° Beaumé, the quantity of liquid being reduced to 8 cubic meters. This quantity of 8 cubic meters of liquid is stored separately and, on further concentration during a subsequent evaporation period 15 kgs. of calcium sulphate, that are normally present, are precipitated plus the 2.1 kgs. of calcium sulphate which this liquid has washed or dissolved in the heating tubes during the first part of the working period. The concentration of the liquid used during the period wherein the incrustations are dissolved is concentrated to only 5° Beaumé and thus no precipitation of calcium sulphate occurs.

Consequently, there will now have been precipitated on the heating tubes a quantity of calcium sulphate of $0.14 \times (15+2.1) = 2.39$ kgs. of calcium sulphate which, in the next operation, is increased to $0.14 \times (15+(2 \times 2.1)) = 2.69$ kgs. In this way, there would, in time, be obtained such an abundance of precipitated calcium sulphate on the heating surface that the dissolving process could not be completed in the time provided therefor.

It is therefore necessary to take suitable measures to see that this continuous concentration, in calcium sulphate or other crust-forming substances, of the liquid to be evaporated, shall not occur. Such measures have already hereinbefore been mentioned and may, for example, consist in drawing off, from time to time, at the intermediate density that is next reached (in the example described, 5° Beaumé), the quantity of liquid that collects in a working period and not sending it through the evaporator for the purpose of obtaining the final concentration, or by, from time to time, for example by thermal or chemical methods of precipitation or the like, rendering the concentration of the crust-forming substance ineffective.

I claim:

1. The process of concentrating solutions which tend to form scale on the heating surfaces of an evaporator comprising heating and evaporating a body of dilute solution in the evaporator for such a period and until such a concentration is reached that a scale of a certain thickness is formed on said evaporator, then without interrupting the heating passing through the evaporator a body of said dilute solution having sufficient solvent power, and in an amount sufficiently in excess of the amount supplied during the concentration period, to dissolve scale formed during the concentrating operation and then concentrating the dilute solution until another scale forms and continuously repeating the two steps described until all the liquid to be concentrated has reached the desired concentration.

2. The process of concentrating scale forming solutions in evaporating apparatus on the heating surfaces of which scale tends to form during the concentrating operation, said process comprising heating and evaporating the solution in said evaporator during a concentration period in which scale is deposited on the heating surfaces of the evaporating apparatus, and then removing said scale during a cleaning period without interrupting said heating, by passing through said evaporator a body of said solution having sufficient solvent power, and in an amount sufficiently in excess of the amount supplied during the concentration period, to dissolve scale formed during the concentrating operation, whereby said body of cleaning solution is concentrated to a limited extent insufficient to cause scale formation during the cleaning operation and scale previously deposited is dissolved from the heating surfaces of the evaporator, at least a portion of said body of cleaning solution being returned to the evaporator for concentration during a later concentration operation.

3. The process of concentrating scale forming solutions in evaporating apparatus on the heating surfaces of which scale tends to form during the concentrating operation, said process comprising heating and evaporating the solution in said evaporator during a concentration period in which scale is deposited on the heating surfaces of the evaporating apparatus, and then dissolving said scale during a cleaning period without interrupting said heating, by passing through said evaporator a body of said solution collected from a previous dissolving operation and having sufficient solvent power, and in an amount sufficiently in excess of the amount supplied during the concentration period, to dissolve scale formed during the concentrating operation, whereby said body of cleaning solution is concentrated to a limited extent insufficient to cause scale formation during the cleaning operation and scale previously deposited is dissolved from the heating surfaces of the evaporator, at least a portion of said body of cleaning solution being returned to the evaporator for final concentration during a later concentration cycle.

4. The process of concentrating scale forming solutions in evaporating apparatus on the heating surfaces of which scale tends to form during the concentrating operation, said process comprising heating and evaporating the solution in said evaporator during a concentration period in which scale is deposited on the heating surfaces of the evaporating apparatus, continuously withdrawing a concentrated product from the evaporator until the evaporating output has decreased to a predetermined amount, and then removing said scale during a cleaning period without interrupting said heating, by passing through said evaporator a body of said solution having sufficient solvent power, and in an amount sufficiently in excess of the amount supplied during the concentration period, to dissolve scale formed during the concentrating operation, whereby said body of cleaning solution is concentrated to a limited extent insufficient to cause a scale formation during the cleaning operation and scale previously deposited is dissolved from the heating surfaces of the evaporator, at least a portion of said body of cleaning solution being returned to the evaporator for concentration during a later concentration cycle and repeating the alternate concentrating and dissolving operations until the cleaning solution no longer possesses residual solvent action to dissolve the scale, and then treating the cleaning solution externally of the evaporator to reduce the concentration of the scale forming substances before returning said cleaning solution to the evaporator.

5. The process of concentrating scale forming solutions in multiple effect evaporating apparatus on the heating surfaces of which scale tends to form during the concentrating operation, said process comprising heating and evaporating the solution to be concentrated in said evaporator during a concentration period in which scale is deposited on the heating surfaces of the evaporating apparatus, continuously drawing off a more concentrated solution and at the completion of the concentration period without interrupting said heating, passing through said evaporator a body of the unconcentrated solution having sufficient solvent power, and in an amount sufficiently in excess of the amount supplied during the concentrating operation, whereby said body of cleaning solution is concentrated to a limited extent insufficient to cause scale formation during the cleaning operation and scale previously deposited is dissolved from the heating surfaces of the evaporator, at least a portion of said body of cleaning solution being returned to the evaporator for concentration during a later concentration cycle.

6. The process of concentrating scale forming solutions in evaporating apparatus on the heating surfaces of which scale tends to form during the concentrating operation, said process comprising heating and evaporating the dilute solution in said evaporator in a concentration period during which an appreciable thickness of scale is deposited on the heating surface of the evaporator apparatus and then removing said scale during a cleaning period without interrupting said heating, by circulating and recirculating through said evaporator a body of said solution having sufficient solvent power, and in an amount sufficiently in excess of the amount supplied during the concentration period, to dissolve scale formed during the concentrating operation, whereby said body of cleaning solution is concentrated to a limited extent insufficient to cause scale formation during the cleaning operation and scale previously deposited is dissolved from the heating surfaces of the evaporator, said body of cleaning solution being returned to said evaporator for final concentration during a later concentration operation.

HEINZ PENDL.